United States Patent
Graeber et al.

(10) Patent No.: US 9,387,920 B2
(45) Date of Patent: Jul. 12, 2016

(54) SELF-SUPPORTING CABIN STRUCTURE

(75) Inventors: Ulrike Graeber, Hamburg (DE); Peter Grosse-Plankermann, Neu Wulmstorf (DE); Martin Paetz, Ratzeburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 452 days.

(21) Appl. No.: 12/420,761

(22) Filed: Apr. 8, 2009

(65) Prior Publication Data

US 2009/0250554 A1    Oct. 8, 2009

Related U.S. Application Data

(63) Continuation of application No. PCT/EP2007/008847, filed on Oct. 11, 2007.

(60) Provisional application No. 60/829,194, filed on Oct. 12, 2006.

(51) Int. Cl.
*B04C 1/00* (2006.01)
*B64C 1/06* (2006.01)
*B64D 11/00* (2006.01)

(52) U.S. Cl.
CPC . *B64C 1/068* (2013.01); *B64C 1/06* (2013.01); *B64C 1/066* (2013.01); *B64D 2011/0046* (2013.01); *Y02T 50/46* (2013.01); *Y10T 29/49826* (2015.01)

(58) Field of Classification Search
CPC .......... B64C 1/068; B64C 1/066; B64C 1/06; Y02T 50/46; B64D 2011/0046
USPC .................................. 244/118.5, 188.1, 129.1
See application file for complete search history.

(56) References Cited

U.S. PATENT DOCUMENTS

| | | | |
|---|---|---|---|
| 2,095,626 A | 10/1937 | Basset et al. | |
| 3,142,461 A | 7/1964 | Naylor | |
| 3,416,274 A | 12/1968 | Webb | |
| 4,050,208 A | 9/1977 | Pompei et al. | |
| 4,799,631 A | 1/1989 | Humphries et al. | |
| 4,989,809 A * | 2/1991 | Arnold | 244/137.1 |
| 5,044,578 A * | 9/1991 | White et al. | 244/119 |
| 5,129,597 A * | 7/1992 | Manthey et al. | 244/118.5 |
| 5,201,831 A | 4/1993 | Higgins et al. | |
| 5,549,258 A * | 8/1996 | Hart et al. | 244/118.1 |

(Continued)

FOREIGN PATENT DOCUMENTS

| | | |
|---|---|---|
| DE | 3881539 T2 | 11/1993 |
| DE | 19639915 A1 | 6/1998 |

(Continued)

OTHER PUBLICATIONS

International Search Authority, PCT Search Report for PCT Application No. PCT/EP2009/053301, Dec. 3, 2009.

(Continued)

*Primary Examiner* — Adriana Figueroa
*Assistant Examiner* — Jessie Fonseca
(74) *Attorney, Agent, or Firm* — Ingrassia Fisher & Lorenz, P.C.

(57) ABSTRACT

A cabin structural unit for attaching cabin installation elements is provided for an aircraft. The cabin structural unit is set up in such a way that a cabin installation element is attachable. The cabin structural unit is implemented as self-supporting and fastenable to an aircraft structure.

12 Claims, 16 Drawing Sheets

(56) References Cited

U.S. PATENT DOCUMENTS

| | | | |
|---|---|---|---|
| 5,687,929 A * | 11/1997 | Hart et al. | 244/118.1 |
| 5,938,149 A * | 8/1999 | Terwesten | 244/118.5 |
| 6,158,690 A | 12/2000 | Wadey et al. | |
| 6,536,710 B1 | 3/2003 | Bobzien et al. | |
| 6,848,654 B1 * | 2/2005 | Mills et al. | 244/118.5 |
| D539,210 S | 3/2007 | Guard et al. | |
| 7,237,749 B2 | 7/2007 | Ritts et al. | |
| 7,252,267 B2 | 8/2007 | Young et al. | |
| 7,293,739 B2 | 11/2007 | Young et al. | |
| 7,331,545 B2 | 2/2008 | Young et al. | |
| 7,380,752 B2 | 6/2008 | Guard et al. | |
| 7,448,574 B2 | 11/2008 | Young et al. | |
| 7,461,816 B2 * | 12/2008 | Schwartz et al. | 244/117 R |
| 7,469,860 B2 | 12/2008 | Young et al. | |
| 7,629,026 B2 | 12/2009 | Sharma et al. | |
| 7,987,596 B2 | 8/2011 | Ritts et al. | |
| 8,226,033 B2 | 7/2012 | Koefinger et al. | |
| 8,262,023 B2 | 9/2012 | Kofinger et al. | |
| 8,430,362 B2 | 4/2013 | Graeber et al. | |
| 8,474,758 B2 | 7/2013 | Koefinger et al. | |
| 8,523,110 B2 | 9/2013 | Schwinning | |
| 8,534,603 B2 | 9/2013 | Grosse-Plankermann et al. | |
| 2003/0042363 A1 | 3/2003 | Dussac et al. | |
| 2005/0044712 A1 | 3/2005 | Gideon et al. | |
| 2005/0082430 A1 | 4/2005 | Young et al. | |
| 2005/0178906 A1 * | 8/2005 | Brauer et al. | 244/118.5 |
| 2005/0184194 A1 * | 8/2005 | Schaefer et al. | 244/118.1 |
| 2005/0236523 A1 | 10/2005 | Schwartz et al. | |
| 2006/0102786 A1 | 5/2006 | Granzeier et al. | |
| 2008/0283662 A1 | 11/2008 | Park | |
| 2009/0250554 A1 | 10/2009 | Graeber et al. | |
| 2009/0272849 A1 | 11/2009 | Koefinger et al. | |
| 2011/0133027 A1 | 6/2011 | Graeber et al. | |
| 2012/0145828 A1 | 6/2012 | Grosse-Plankermann et al. | |

FOREIGN PATENT DOCUMENTS

| | | |
|---|---|---|
| DE | 103 39 508 A1 | 3/2005 |
| DE | 10 2005 023 886 A1 | 12/2006 |
| EP | 0279620 A2 | 8/1988 |
| EP | 0437870 A1 | 7/1991 |
| GB | 2287517 A | 9/1995 |
| GB | 2317825 A | 4/1998 |
| JP | 56047400 A | 4/1981 |
| JP | 57004455 A | 1/1982 |
| JP | 2001171515 A | 6/2001 |
| JP | 2005112354 A | 4/2005 |
| JP | 2005125998 A | 5/2005 |
| RU | 2191716 C2 | 10/2002 |

OTHER PUBLICATIONS

International Searching Authority, International Search Report dated Jan. 21, 2008 for International Application No. PCT/EP2007/008847.

International Searching Authority, Partial International Search Report dated Oct. 7, 2009 for International Application No. PCT/EP2009/053301.

"Freitragend." Wikipedia, The Free Encyclopedia. Wikimedia Foundation, Inc., Aug. 3, 2011 [retrieved on Aug. 8, 2012]. Retrieved from Internet <URL: de.wikipedia.org/wiki/Freitragend>.

United States Patent and Trademark Office, US Notice of Allowance dated Jan. 10, 2013 for U.S. Appl. No. 12/936,714.

USPTO, Office Action for U.S. Appl. No. 13/479,538, mailed Mar. 4, 2014.

USPTO, Final Office Action for U.S. Appl. No. 13/479,538, mailed Jul. 9, 2014.

Response to Office Action for U.S. Appl. No. 13/479,538, mailed Jun. 18, 2014.

* cited by examiner

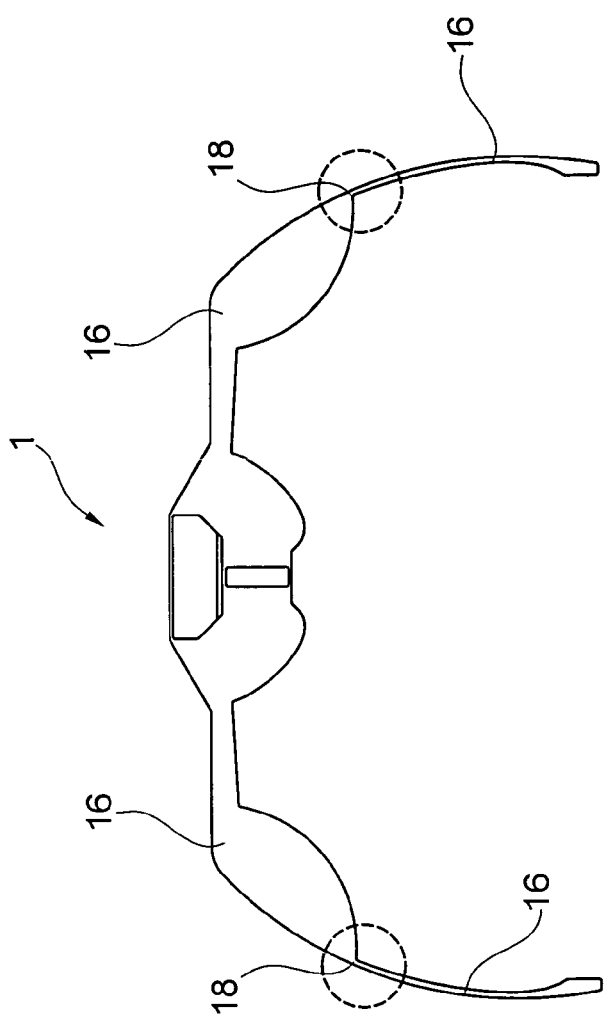
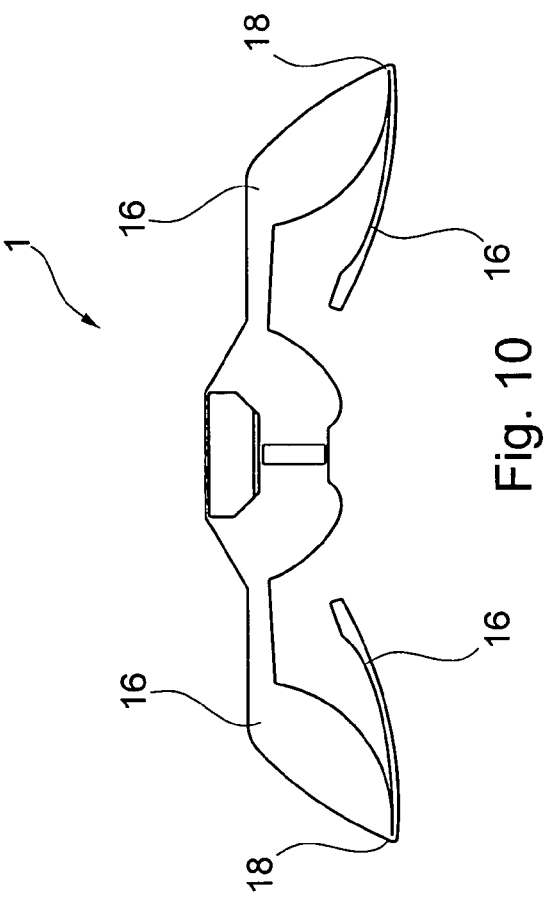
Fig. 9
Fig. 10

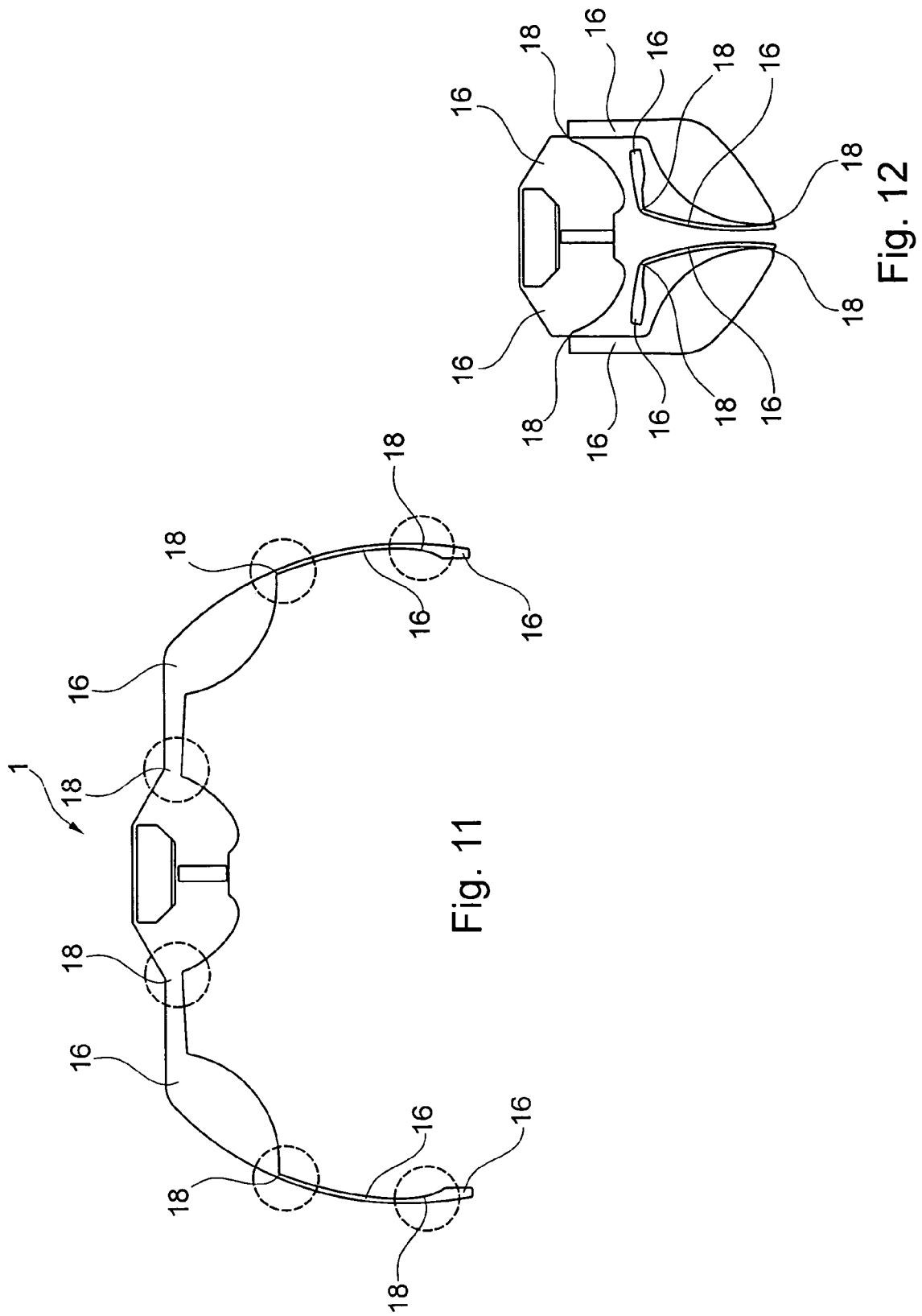

SELF-SUPPORTING CABIN STRUCTURE

CROSS-REFERENCE TO RELATED APPLICATION

This application is a continuation of International Application No. PCT/EP2007/008847, filed Oct. 11, 2007, which was published under PCT Article 21(2), and this application claims priority to German Patent Application No. 102006048376.6 filed Oct. 12, 2006 and this application also claims priority to U.S. Provisional Patent Application No. 60/829,194 filed Oct. 12, 2006, the disclosure of which applications is hereby incorporated herein by reference.

TECHNICAL FIELD

The present invention relates to a cabin structural unit for attaching cabin installation elements for an aircraft, a method for attaching cabin installation elements for an aircraft, a use of a cabin structural unit for attaching cabin installation elements, a method for installing a cabin structural unit, and an aircraft comprising a cabin structural unit for attaching cabin installation elements.

BACKGROUND

In current passenger aircraft, the cabin installation elements, such as baggage compartments, panel parts, or other internal installation elements are installed directly to the aircraft structure, such as the frames, the stringers, or other supporting elements of the aircraft fuselage. Because of greatly varying structural stresses, such as the buildup of a pressurized field in the interior, thermal deformations, or stresses from flight mechanics, the aircraft structure is continuously subjected to deformations. This deformation of the aircraft structure thus automatically also results in a change of the position of the cabin installation elements, because they are attached directly to the structure.

To counteract these deformations of the aircraft structures and thus the displacement of the cabin installation elements, longitudinal and radial gaps having a sufficient width run between the cabin installation elements. The gaps may have dimensions between about 8 mm and about 25.4 mm, for example.

Using these gaps, the cabin installation elements may move in relation to one another without wedging or other damage of the cabin installation elements occurring upon a deformation of the aircraft structure. However, these gaps must be appropriately sealed to prevent or to minimize a temperature exchange or a noise exchange between the internal cabin and the environment. Therefore, the radial gap is sealed using a so-called infill strip and the remaining gaps are typically sealed using a silicone lip seal.

Because of the continuous movement of the cabin installation elements in relation to one another, these seals must be maintained and replaced if necessary to thus still be able to ensure tightness in relation to noise and temperature.

Among other things, it is at least one object of the present invention to provide an attachment structure for cabin installation elements. In addition, other objects, desirable features, and characteristics will become apparent from the subsequent summary and detailed description, and the appended claims, taken in conjunction with the accompanying drawings and this background.

SUMMARY

The at least one object may be achieved by a cabin structural unit for attaching cabin installation elements and a method for attaching cabin installation elements for an aircraft and by the use of a cabin structural unit for attaching cabin installation elements in an aircraft, by a method for installing a cabin structural unit, and an aircraft having a cabin structural unit for attaching cabin installation elements having the features as subsequently described and claimed.

According to an exemplary embodiment of the present invention, a cabin structural unit for attaching cabin installation elements for an aircraft is provided. The cabin structural unit is set up in such a way that a cabin installation element is attachable. The cabin structural unit is adapted for being self-supporting. Furthermore, the cabin structural unit adapted for being fastenable to an aircraft structure.

According to a further exemplary embodiment, a cabin system for attaching cabin installation elements is provided. The cabin system comprises a first cabin structural unit described above and a second cabin structural unit described above as well as a compensation element. The compensation element is set up between the first cabin structural unit and the second cabin structural unit in such a way that tolerances may be compensated for. The compensation element may also consist of door entrance sections or galleys that are able to compensate movements between the different cabin structural units.

According to a further exemplary embodiment, a method for attaching cabin installation elements for an aircraft is provided. A cabin installation element is fastened to a cabin structural unit. The cabin structural unit is fastened to an aircraft structure, the cabin structural unit being implemented as self-supporting.

According to a further exemplary embodiment of the present invention, a cabin structural unit for attaching cabin installation elements according to the above exemplary embodiments is used in an aircraft.

According to a further exemplary embodiment, an aircraft having a cabin structural unit for attaching cabin installation elements according to one of the above embodiments is provided.

The term "self-supporting" is understood as a component and/or a structural unit which manages to fulfill its function even without further load-carrying elements. For this purpose, the "self-supporting" structural unit is to be implemented in such a way that all stresses occurring in operation may be absorbed by the structural unit. In other words, a self-supporting structural unit may absorb forces and torques without having to be supported itself by other external structures. A statically stable, freestanding structure is thus understood as a "self-supporting structure".

The self-supporting cabin structural unit may thus retain the cabin installation elements independently self-supporting, without being depended on support functions of the aircraft structure. Therefore, struts and reinforcements between the cabin structural unit and the aircraft structure may be dispensed with. Because of the few contact points of the cabin structure with the aircraft structure, the deformations of the aircraft fuselage and/or the aircraft structure are hardly relayed to the cabin structural unit, so that a relative movement of the cabin installation elements to one another is reduced.

The cabin structural unit thus forms a unit that is statically independent per se, without structural reinforcement measures connected to the aircraft structure being needed. The cabin structural unit may only be secured in regard to displacement within the aircraft structure. Other torques, stresses, or strains may not or hardly be introduced from the aircraft structure into the self-supporting cabin structure. The cabin structural unit may thus be independent of a deformation of the aircraft structure. Represented as an image, the construction of the cabin structural unit may be understood as that of a tent, in which an internal tent and an external tent exist independently of one another, the internal tent solely having to be secured against slipping from the external tent. Movements of the external tent hardly influence the internal tent.

The effects of wind, temperature, or other structural movements on the cabin structure are thus damped and only transmitted via the fasteners between the cabin structural unit and the aircraft structure, so that a deformation of the cabin structural unit and thus the cabin installation elements may hardly occur. The cabin structural unit thus forms a united self-supporting and/or freestanding static composite with the cabin installation elements, without or respectively almost without absorbing deformation torques of the external aircraft structure.

Therefore, the required compensation gaps, as have to be used in the prior art, may be greatly reduced in their width, because hardly any relative movement exists between the cabin installation elements due to the cabin structure. Therefore, wide tolerance gaps may no longer necessary. The cabin installation elements may thus be situated in such a way that only small separation gaps remain. These separation gaps may be implemented as joins by introducing a silicone sealing compound, for example. Because of the reduction of the width of the gaps between the cabin installation elements, a higher state of comfort, design, and noise level may be achieved. In addition, the number of lip seals may be reduced. Because of the reduction of the size of the gaps, a lower noise level enters the cabin. Because the current seals for the wide tolerance gaps, such as lip seals, have appearances of material fatigue and baggage frequently hits these seals in flight operation, these seals often have to be replaced. The adhesive faces of the seals additionally often have to be reworked. In addition, because of the adhesion of the seals to the cabin installation elements, replaceability may be made more difficult. Therefore, in the event of layout changes of the cabins, these seals usually have to be completely replaced. Because of the reduction of the gaps and thus the reduction of the seals, costs are saved and better maintainability may be achieved. In addition, defective seals frequently result in customer complaints, which may therefore also be reduced.

The term aircraft structure may be understood as all supporting elements of an aircraft, such as stringers, frames, transverse girders, floor girders, or other supporting elements of an aircraft fuselage.

A compensation element may be understood as a gap as well as damper elements that may compensate for a movement of the first cabin structural unit and the second cabin structural unit to one another. Tolerances mean, for example, movement tolerance, dimensional tolerances, or strain tolerances, which are induced because of temperature changes, for example.

According to a further exemplary embodiment, the cabin structural unit comprises a loose bearing device. The cabin structural unit may be fastened to an aircraft structure using the loose bearing device in such a way that the cabin structural unit is displaceable along an aircraft longitudinal direction. The term loose bearing device is understood as a freely movable bearing which comprises at least one degree of translation freedom (i.e., permits movements in one direction).

The term aircraft longitudinal direction is understood as the direction in which the fuselage extends cylindrically. In technical terminology, an aircraft-fixed coordinate system is known, in which the x-axis extends along this aircraft longitudinal direction (i.e., is defined along the extension direction of the aircraft fuselage). The lateral extension direction (i.e., orthogonal to the x direction), is called the y-axis. The extension in the vertical orientation and orthogonal to the x and y axes is called the z-axis.

With the possibility of attaching the cabin structural unit to an aircraft structure using the loose bearing device, the cabin structural unit may be movable and/or displaced in relation to the aircraft structure. Thus, the cabin structural unit including the cabin installation elements fastened thereto may be displaced along the aircraft longitudinal direction (i.e., along the x-axis). Because of the loose bearing device, no deformation forces of the aircraft structure are thus transmitted to the cabin structural unit. In addition, the cabin layout may be changed flexibly using the cabin structural unit, because the cabin installation elements, such as entire rows of seats including their associated baggage compartments, may be fastened to a cabin structural unit and thus are displaceable easily and rapidly as a whole. Large amounts of retrofitting work may not necessary for this purpose, so that the retrofitting time and the retrofitting costs of a cabin layout may be reduced.

According to a further exemplary embodiment, the cabin structural unit comprises a fixed bearing device. The cabin structural unit may be fastenable to the aircraft structure using the fixed bearing device in such a way that forces are transmittable along the aircraft longitudinal axis.

A fixed bearing device is understood as a bearing apparatus, which fixes the cabin structural unit in all three degrees of translation freedom. Torques, such as bending torques, torsion torques, or other torques, which are induced by the aircraft structure, may not be transmitted using the fixed bearing, so that nonetheless no deformation of the cabin structure occurs. At the fixed bearings, the forces are transmitted punctual, for example. The cabin structural units may be partially decoupled, so that deformations of the cabin structural units as result of deformation of the fuselage may be reduced.

Using the fixed bearing device, the cabin installation structure may be secured against displacements in relation to the aircraft structure, without deformation torques being transmitted from the aircraft structure to the cabin structural unit. Therefore, in spite of deformation of the aircraft structure, the cabin structural unit remains dimensionally stable (i.e., deformation energy and/or deformation torques are not transmitted respectively deformation energy and deformation torques are transmitted only marginally). Therefore, the cabin structural unit may be fastened to the aircraft structure in relation to the aircraft longitudinal direction, without forces, which are caused because of external influencing factors, such as temperature differences or other structural movements, being transmitted to the cabin structural unit. Therefore, the size and/or the width of the compensation gaps that are situated between the cabin installation elements to buffer relative movements may be reduced.

According to a further exemplary embodiment, the cabin structural unit comprises a damping element. The cabin structural unit may be fastenable to the aircraft structure using the damping element in such a way that oscillations of the aircraft structure may be damped. Oscillations of the aircraft structure arise, for example, due to the aircraft engine or due to natural oscillations of the components. The oscillations may be reduced between the connection points of the self-supporting cabin structure and the aircraft structure using the damping elements, by which the influence of the oscillations on the cabin installation elements is also reduced. Damping elements may comprise hard rubber, the so-called shock mounts, or spring-damper systems, for example.

According to a further exemplary embodiment, the cabin structural unit comprises a plurality of support frames and a longitudinal stiffening rib, the longitudinal stiffening ribs being set up between each of the plurality of support frames. The longitudinal stiffening rib is set up to transmit a force along the aircraft longitudinal axis or the x-axis. In other words, a longitudinal stiffening rib is inserted between each two support frames to transmit forces along the aircraft longitudinal axis. Therefore, a static, stable composite of support frames and longitudinal stiffening ribs may be provided, which may comprise low material requirements. A static, stable, and self-supporting cabin structural unit may be provided using this light construction, to which arbitrarily many cabin installation elements may be attachable. The longitudinal stiffening rib may consist of a rip or a ventilation duct, for instance.

According to a further exemplary embodiment, the cabin structural unit also comprises a fastener, the cabin installation elements being replaceably fastenable to the cabin structural unit using the fastener. The fastener may comprise various quick-release fasteners, screw connections, or other removable fasteners to fasten the cabin installation element to the cabin structural unit. Furthermore, plug-in systems may also be used as fasteners, which rapidly connect the cabin installation elements of the cabin structure. Therefore, the cabin installation elements, such as a baggage compartment or an aircraft seat, may be removed from the cabin structural unit using a few handles and replaced by other cabin installation elements. For example, if a seat element is defective, it may be replaced rapidly by an intact seat element, without arising long maintenance times and thus maintenance costs.

According to a further exemplary embodiment, the cabin installation element may be installed integrally and in one piece to the cabin structural unit. Thus, for example, a baggage compartment may be manufactured together with a support frame and installed in the cabin. Therefore, entire units may be installed more rapidly in aircraft structure and may additionally be manufactured with less material outlay. If a cabin installation element is integral and in one piece (i.e., a part of the cabin structural unit, fasteners or tolerances may be dispensed with).

According to a further exemplary embodiment, the cabin installation element is set up on the cabin structural unit in such a way that a force flux is transmittable. Therefore, the cabin installation element itself may reinforce the static composite of the cabin structural unit. The cabin installation element is connected to the cabin structural unit in such a way that forces are transmittable in all translation directions. Further reinforcement elements which have to contribute to the self-supporting cabin structural unit may thus become unnecessary and/or be reduced. Therefore, material and costs may be saved.

According to a further exemplary embodiment, the cabin structural unit comprises a stiffening face. The cabin structural unit may thus be manufactured in shell form, the shell comprising composite fiber material, for example. Therefore, the static composite of the cabin structural unit may comprise a semicircular shape along the aircraft longitudinal axis, for example, which may absorb all forces of the cabin installation elements. The stiffening faces may simultaneously represent a cabin panel, so that no further design elements are additionally necessary. For example, a sandwich construction comprising a core material, such as a so-called honeycomb having prepreg layers, may be used as a construction material for the stiffening faces. The honeycomb comprises a honeycomb structure. Weight and costs may be saved by these stiffening faces.

According to a further exemplary embodiment, the support frames of the plurality of support frames comprise a plurality support elements, the plurality of support elements being removably fastenable to one another. The support frames may be constructed modularly using removable fasteners, such as screw connections, and may be changed in their size, for example. This may offer advantages when mounting the support frames, adaptability to various fuselage diameters being made possible. Multiple standard parts may be used precisely in consideration of production technologies, which may be adjusted in their overall size using individually manufactured parts of different sizes. Production costs and mounting costs may thus be reduced.

According to a further exemplary embodiment, the plurality of support elements is fastenable to one another using a plug-in connection. A cabin structure may be assembled rapidly using a plug-in connection, without having to use fasteners.

According to a further exemplary embodiment, the aircraft structure comprises a floor structure, the cabin structural unit being fastenable to the floor structure. The floor structure of an aircraft runs transversely in the horizontal direction to the aircraft longitudinal axis. No respectively less external effects, which normally engage on the aircraft skin, engage on the floor structure and/or the transverse girders of the aircraft structure. Therefore, external influences which are induced by wind or ambient temperatures may be neglected. The floor structure thus comprises less deformation than the aircraft skin and/or the stringers and frames of the aircraft skin. Therefore, a deformation of the fastening face of the cabin structural unit may be reduced and/or damped.

According to a further exemplary embodiment, the cabin installation unit is selected from the group comprising toilet units, kitchen units, seat units, design elements, stairway elements, baggage compartments, air provision units, window panels, and elevator units. This exemplary list is not to be understood as an exhaustive list. In principle, any installation elements found in the cabin of an aircraft are to be understood as cabin installation units, which are fastenable to the cabin structural unit.

According to a further exemplary embodiment the cabin structural unit comprises cabin structural segments, wherein the cabin structural segments are connected by hinges for being foldable.

Each cabin structural unit may be divided in a plurality of cabin structural segments. The cabin structural segments may consist of the longitudinal stiffening rips, stiffening faces, air ducts or any other segments that provides static properties for the cabin structural units. The entirety of the cabin structural segments may form the cabin structural unit in circumferential direction for example.

By hinging the cabin structural unit respectively the structural segments, the volume of the whole unit may be reduced, so that the mounting of the unit may be eased. The cabin structural unit may be folded together and carried to the mounting position and thus be extracted to the operational design. It is also possible to preassemble the cabin structural unit with its cabin installation elements outside of the aircraft fuselage and then carrying the preassembled and folded cabin structural unit into the aircraft fuselage to the mounting position. The preassembled and folded cabin structural unit may be carried through small openings, such as doors of an aircraft, so that it is also easier to change the cabin layout after the fuselage is assembled together. Further on, if the cabin structural unit is preassembled outside of an aircraft, less assemblers may be necessary inside the aircraft fuselage simultaneously, so that interference due to less working space in the fuselage between the assemblers may be reduced. Thus, the assembling process of the cabin structural unit as well as the whole assembling process of the aircraft may be accelerated and less complicated.

According to a further exemplary embodiment, the cabin structural unit further comprises interface elements. The interface elements are adapted to connect the cabin installation elements with the aircraft structure or with the floor structure.

For connecting the cabin installation elements with the aircraft structure, several for instance standardized, interface elements may be provided for achieving an easy and short time assembling procedure. If the cabin installation element consists for instance of a window, the window has to be connected to the window opening in the aircraft structure. Thus, an interface element has to be provided in order to seal the inside of the aircraft from the low-pressure environment. The interface elements may consist of an easy push-in and snap connection comprising window-sealing elements etc. The interface elements may also provide compensation properties in order to compensate relative movements between the cabin structural unit and the fuselage structure as a result of different temperature or pressure levels, for instance. The interface elements may also be selected from one of the group consisting of electrical connectors, air duct connectors or data line connectors.

According to a further exemplary embodiment the cabin structural unit is adapted for supporting the aircraft structure. As mentioned above, the cabin structural unit is self-supporting, so that the cabin structural unit may hold its own weight. Additionally, the cabin structural unit may be adapted for absorbing forces and torques for example from the fuselage structure. Thus, the aircraft structure may be designed more lightweight so that the overall weight of the aircraft may be reduced. The cabin structural unit may thus comprise static properties in order to support the aircraft structure.

According to a further exemplary embodiment of the method, in a first step, the cabin element is attached to the cabin structural unit and in a following second step, the cabin structural unit inclusively the cabin installation element is fastened to the aircraft structure. The possibility thus exists of pre-mounting the cabin installation elements on the cabin structural unit, so that the production method of the aircraft may be improved. Thus, for example, the aircraft mounting may be performed in simultaneously to the cabin mounting and not, as is typical, the aircraft being produced first and the cabin then being mounted. This results in reduced production times and thus lower production costs. The cabin structural unit is thus pre-mountable as a whole or only partially including all cabin installation elements and may subsequently be introduced into the aircraft fuselage. The sections of the aircraft fuselage remain open during the mounting of the cabin structure and are closed using the aircraft tail or aircraft bow after the cabin mounting.

According to a further exemplary embodiment of the invention a method for installing a cabin structural unit for an aircraft as described above is provided. The cabin structural unit is pre-assembled outside of an aircraft structure. The pre-assembled cabin structural unit is guided through an opening of the aircraft structure. Further on, the pre-assembled cabin structural unit is implemented at a predetermined location in the aircraft structure. The pre-assembled cabin structural unit is fixed at the predetermined location in the aircraft structure.

By exercising the installing method, it is possible to pre-assemble the cabin structural unit outside of an aircraft so that assembling proceedings of the aircraft may be separated and accomplished simultaneously. Thus, for instance the isolation of the aircraft structure may be installed, whereas the cabin structural units may be assembled outside of the aircraft simultaneously. In a next step, the whole cabin structural units may be guided to the open fuselage sections and then installed at a predetermined location in the aircraft structure. Thus, the logistic complexity may be reduced, because all equipment parts, such as cabin installation elements may be stored and assembled outside of the aircraft fuselage. Also the amount of assemblers working in the fuselage simultaneously may be reduced, because the assemblers for the cabin structural unit may assemble the cabin outside of the aircraft fuselage. Thus, also the assembling procedures are more economically and ergonomically because more space for the assemblers may be available. Thus, the assembling procedures of the fuselage, the cabin and the whole aircraft may be eased and accomplished more quickly.

According to a further exemplary embodiment of the method, the pre-assembled cabin structural unit is adapted to be foldable. Thus, the pre-assembled cabin structural unit is folded before guiding the pre-assembled cabin structural unit through the opening of the aircraft structure. At the predetermined location in the aircraft structure the pre-assembled cabin structural unit is unfolded.

By folding the cabin structural units, respectively the pre-assembled cabin structural units, less space respectively smaller openings in the aircraft fuselage have to be provided in order to guide the cabin structural unit into the fuselage to the predetermined fixing points. In the aircraft fuselage the cabin structural units may be unfolded and fixed to the predetermined location. Thus, also small openings, such as doors, are capable for guiding the folded preassembled cabin structural unit into the fuselage. Thus, also after the aircraft is completely assembled respectively the fuselage is finished, cabin structural units may be assembled also exchangeable. If, for instance, the airliners prefer flexible cabin layouts, changes in the cabin layout may be provided quickly by folding the cabin structural units, guiding them outside of the aircraft fuselage through the door and installing another different cabin structural unit.

According to a further exemplary embodiment of the method, the cabin installation element is installed into the pre-assembled cabin structural unit outside of the aircraft structure. Thus, the cabin installation elements may be assembled to the cabin structural unit simultaneously to the aircraft structure. The overall production time may be reduced.

According to a further exemplary embodiment of the method the opening of the aircraft structure is selected from one of the group consisting of fuselage doors, openings of fuselages segments and cargo doors.

According to a further exemplary embodiment of the method the cabin structural unit comprises cabin structural segments, wherein the cabin structural segments are connected by hinges for being foldable. The cabin structural unit may also be divided into cabin structural segments that are connected by hinges, so that several possibilities of folding a cabin structural unit may be provided. Thus, a very small volume of a folded and preassembled cabin structural unit may be provided, so that even the smallest openings in the fuselage structure may be utilized for guiding this cabin structural unit to the predetermined assembling location into the fuselage.

The exemplary embodiments of the cabin structural unit also relate to the cabin system, the method, the use, the aircraft and the method for installing a cabin structural unit, and vice versa.

BRIEF DESCRIPTION OF THE DRAWINGS

The present invention will hereinafter be described in conjunction with the following drawing figures, wherein like numerals denote like elements, and:

FIG. 9 to 12 show exemplary illustrations of foldable cabin structural units according to exemplary embodiments of the invention;

DETAILED DESCRIPTION

The following detailed description is merely exemplary in nature and is not intended to limit application and uses. Furthermore, there is no intention to be bound by any theory presented in the preceding background and summary or the following detailed description.

Figure 3:
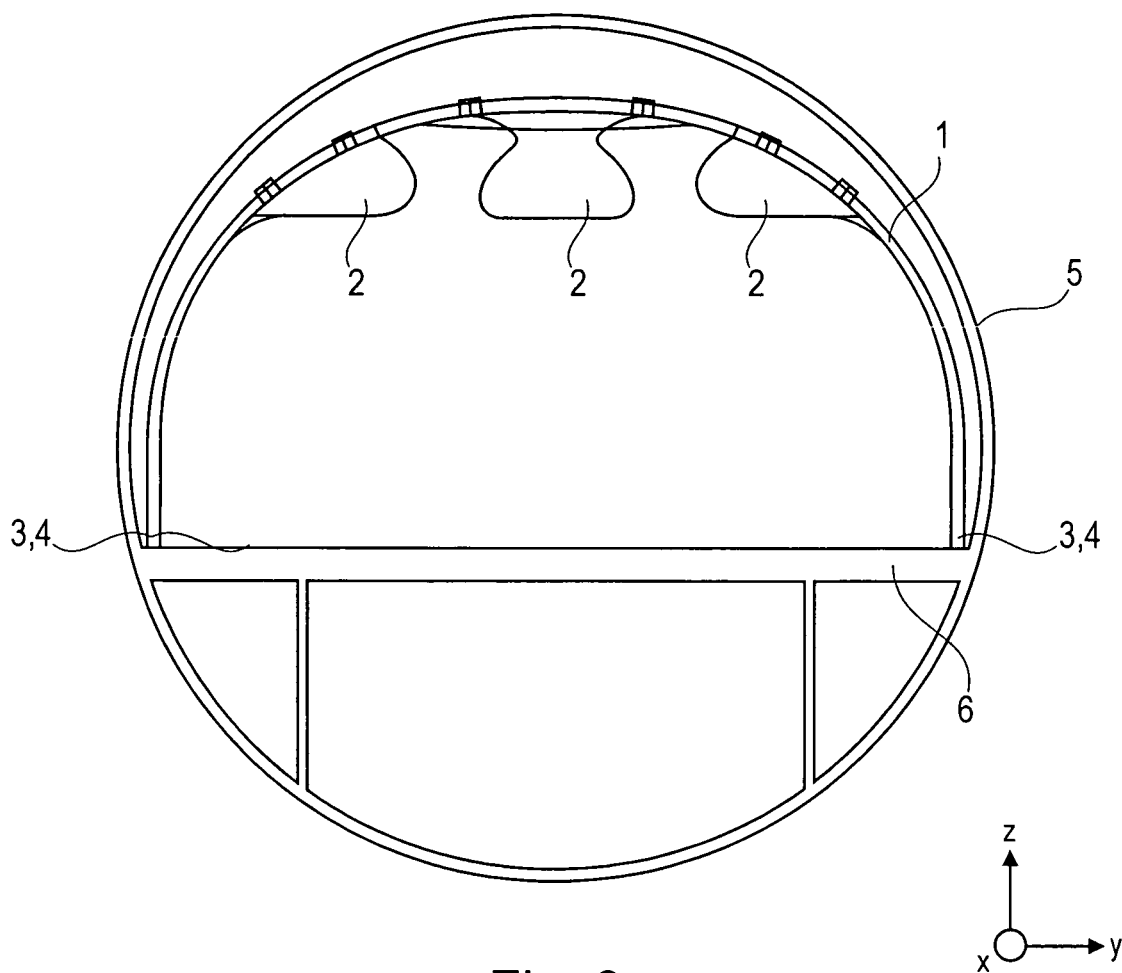
FIG. 3 shows a schematic illustration of an exemplary embodiment of the present invention, in which cabin installation elements are fastened to a cabin structural unit.

FIG. 3 shows an exemplary embodiment of the present invention, in which a cabin structural unit 1 having cabin installation elements 2 is shown in an aircraft structure 5. The cabin structural unit 1 is provided for attaching cabin installation elements 2 for an aircraft. The cabin structural unit 1 is adapted for attaching a cabin installation unit 2. The cabin structural unit 1 is adapted for being self-supporting and fastenable to an aircraft structure 5, 6. The cabin structural unit 1 may be attached using a loose bearing 3 or a fixed bearing 4 to an aircraft structure 5 or a floor structure 6 of the aircraft. Because the cabin structural unit 1 is implemented as self-supporting, no additional stiffening means or fasteners may be attached to the aircraft structure 5 or the floor structure 6.

Because the cabin structural unit 1 is implemented as self-supporting, and/or freestanding, this cabin structural unit 1 may be manufactured outside the aircraft structure 5 and equipped with the cabin installation elements 2, for example. Then may the cabin structural unit 1 be installed as a whole in the aircraft structure 5. Therefore, parallel manufacturing sequences, on one hand, for example, manufacturing the aircraft fuselage, and on the other hand simultaneously manufacturing the cabin structural unit 1, may be implemented, so that production costs may be saved.

Figure 1:
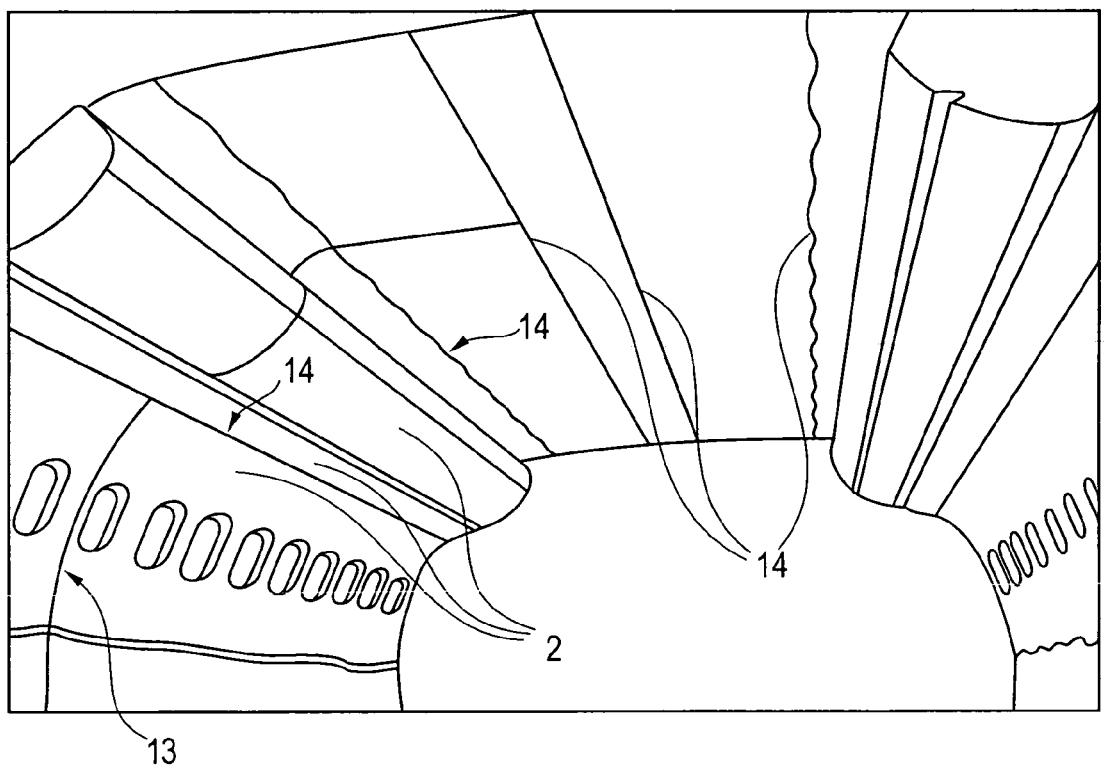
FIG. 1 shows a schematic illustration of a configuration of cabin installation elements known from the prior art.

FIG. 1 shows an exemplary embodiment of a configuration of cabin installation elements 2, as it is known from the prior art. The cabin installation elements 2 are fastened individually to the aircraft structure 5. Because of deformations of the aircraft structure 5, for example, as a result of external influences such as temperature oscillations or flight strains, either a radial gap 13 or a longitudinal gap 14 has to be provided between each cabin installation element 2. Only in this way may relative movements between the cabin installation elements 2 be compensated for. The radial gaps 13 and the longitudinal gaps 14 may, however, dampen or insulate noise or temperature only poorly or not at all. Therefore, noise and ambient temperature enters the cabin interior through the gaps 13, 14, which may result in a disadvantage in cabin comfort.

Figure 2:
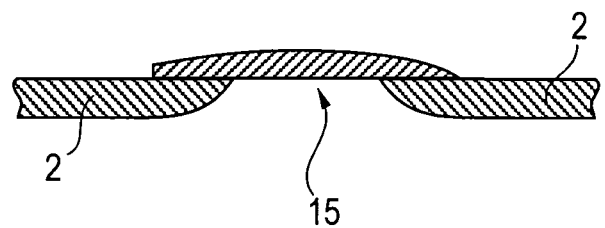
FIG. 2 shows a schematic illustration of a seal configuration between cabin installation elements known from the prior art.

FIG. 2 shows a seal configuration of the radial gaps 13 and the longitudinal gaps 14 known from the prior art. A seal, such as a lip seal 15, has to be situated between the cabin installation elements 2 in each case to prevent penetration of temperatures or noise levels. These lip seals 15 are subject to maintenance, however, and therefore have to be monitored for their tightness and maintained continuously, so that a high maintenance effort and high material costs arise. In addition, a replacement of cabin elements 2 results in the lip seals 15 additionally having to be replaced, because of which additional material costs may arise.

Figure 4:
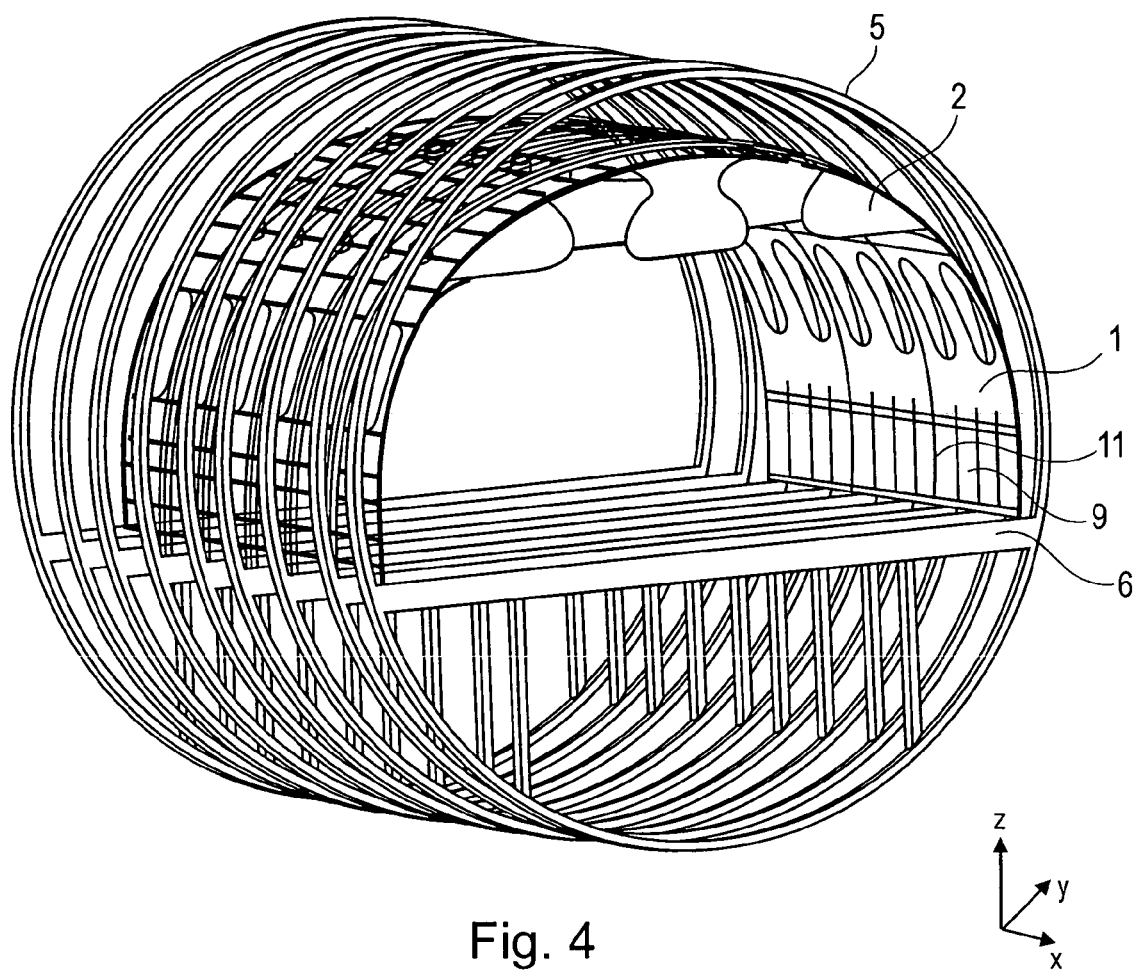
FIG. 4 shows a spatial illustration of an exemplary embodiment of the cabin structural unit in an aircraft fuselage.

FIG. 4 shows a spatial illustration of a further exemplary embodiment of the cabin structural unit 1. Various cabin installation elements 2 may be situated independently of an aircraft structure 5 on the cabin structural unit 1. The cabin installation elements 2 may comprise baggage stowing spaces, the so-called hat racks, or other panel or seat elements, as shown. The cabin structural unit 1 may comprise a plurality of support frames 11 and/or stiffening faces 9. The cabin structure 1, which comprises stiffening faces 9 and/or support frames 11, is implemented as self-supporting, so that no support connections are needed between the aircraft structure 5 and the cabin structural unit 1. The cabin structure 1 may, for example, be situated using a loose bearing 3 or a fixed bearing 4 on the aircraft structure 5 or, as shown in FIG. 4, for example, on the floor structure 6. Using a loose bearing 3, which permits one degree of translation freedom, or a fixed bearing 4, the cabin structural unit 1 may be retained in its position in relation to the aircraft fuselage and/or the aircraft structure 5, without torques of the aircraft structure 5 being transmitted to the cabin structural unit 1. Such torques may comprise torsion torques or bending torques of the fuselage, for example. These torques have been transmitted directly to the cabin installation elements 2 up to this point because of the attachment of the cabin elements 2 to the aircraft structure 5, so that a relative movement of the cabin installation elements 2 to one another resulted. Because the deformation torques (i.e., the bending or torsion torques of the aircraft structure), for example, are no longer transmitted to the cabin structural unit 1, on which the cabin installation elements 2 are situated, no or hardly any relative movement of the cabin installation elements 2 occurs. Therefore, no compensation gaps (i.e., radial gaps 13 or longitudinal gaps 14), have to be provided between the cabin elements 2. Insulation material, such as lip seals 15, may be saved by the reduction of the gaps 13, 14 and greater tightness to noise and external temperature influences may additionally be provided.

Figure 5:
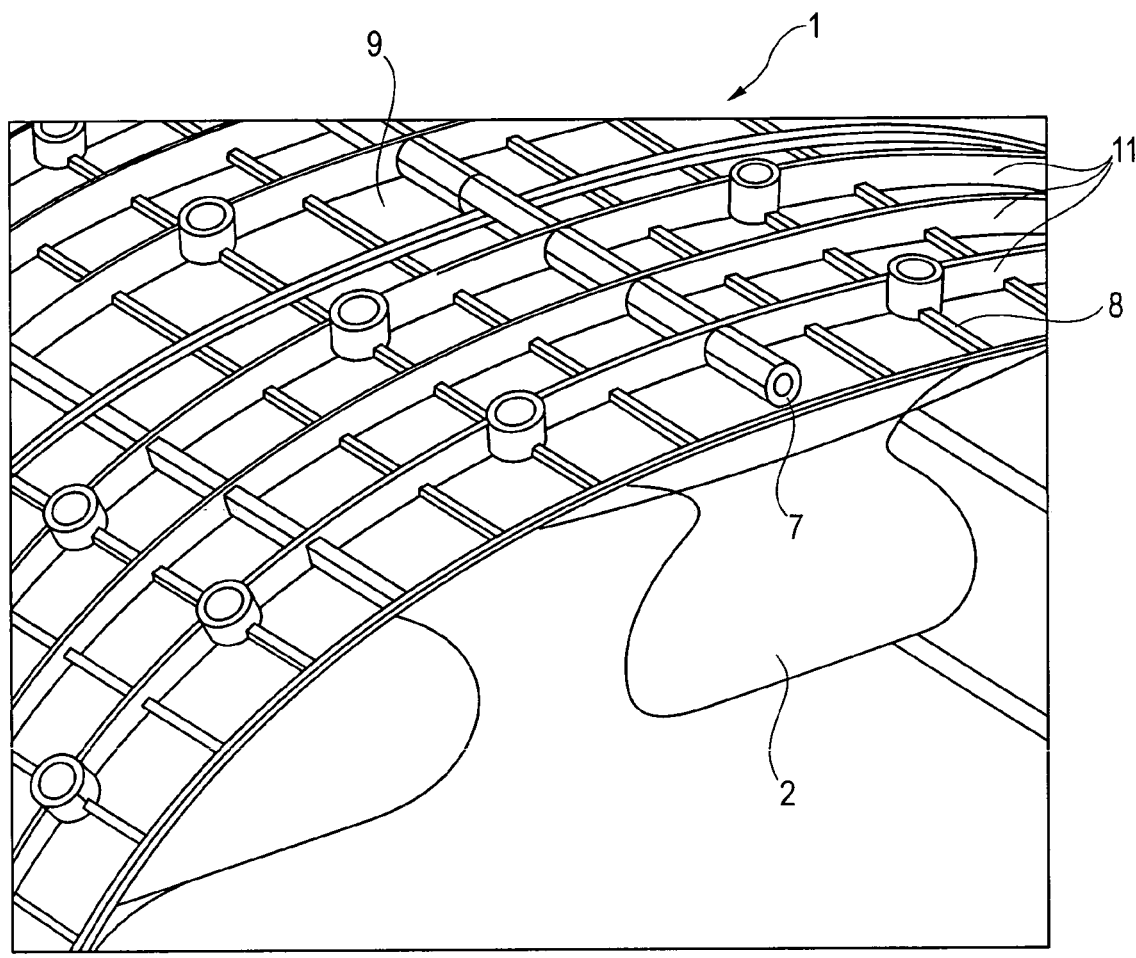
FIG. 5 shows an enlarged illustration of the cabin structural unit according to an exemplary embodiment of the present invention.

FIG. 5 shows an enlarged view of a cabin structural unit 1, to which installation elements 2 are attached. The cabin structural unit 1 comprises curved support frames 11, which additionally have reinforcement faces 9. Longitudinal stiffening ribs are additionally situated for stiffening in the cabin structural unit 1 along the aircraft longitudinal axis and/or along the x-axis of an aircraft-fixed coordinate system. Therefore, a self-supporting cabin structural unit 1 may be provided, which may support and/or absorb the loads of the cabin installation elements 2. Other cabin installation elements 2, such as supply lines 7, may also be situated on the cabin structural unit 1. Therefore, the possibility additionally exists of situating any lines for the electronics or air delivery lines of the air conditioner or other supply lines 7 on the cabin structural unit. Because hardly any relative movement and/or deformation of the cabin structural unit 1 occurs due to the freestanding and/or self-supporting cabin structural unit 1, manufacturing tolerances of the connection pipes 7 may also be dispensed with, and/or the manufacturing tolerances of the connection pipes 7 may be reduced.

Furthermore, the cabin installation elements 2 may be fastened to the cabin structural unit 1 using removable fasteners, so that a rapid replacement may be performed. By using quick-release fastener, for example, any cabin installation unit 2 may be removably attached to the cabin structural unit 1, so that a rapid exchange of the entire cabin layout may be performed. Complex and costly seal elements, such as lip seals between the cabin elements 2, may be dispensed with, because no gap 13, 14 exists.

Figure 6:
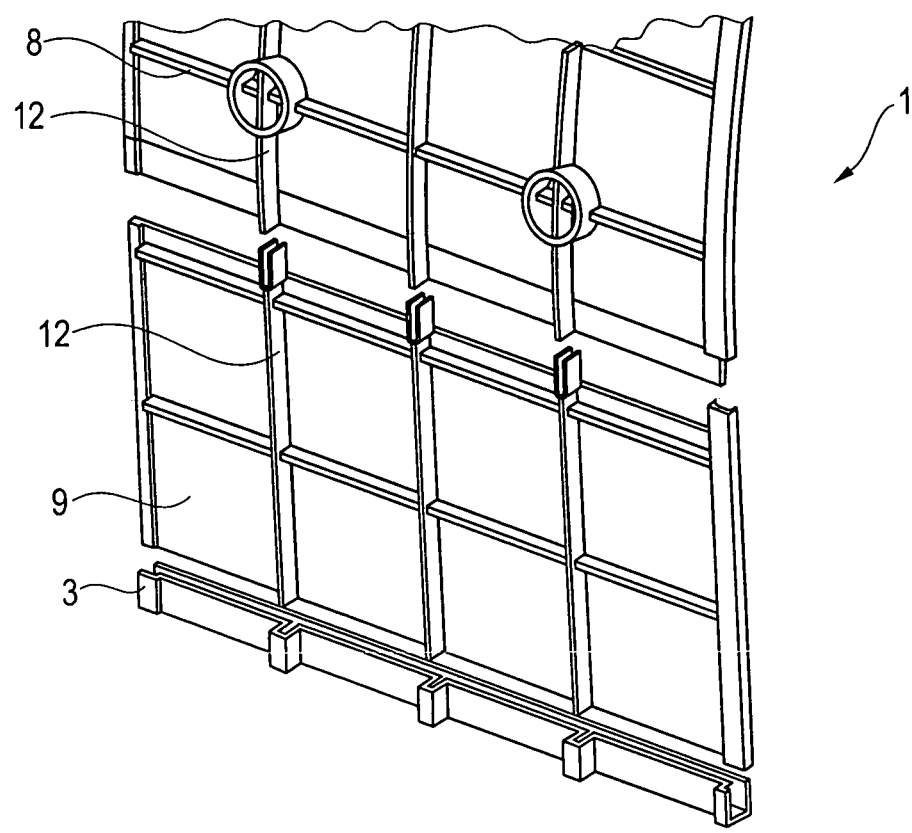
FIG. 6 shows a schematic illustration of a connection system of the cabin structural unit according to an exemplary embodiment.

FIG. 6 shows an exemplary embodiment of a cabin structural unit 1. The cabin structural unit 1 comprises various support frames 11, which comprise a plurality of support elements 12. In addition, the cabin structural unit 1 comprises longitudinal stiffening ribs 8 and stiffening faces 9. The support elements 12, the stiffening faces 9, and the longitudinal stiffening ribs 8 may be assembled via a plug-in connection in a simple way, for example, all necessary forces being able to be transmitted. Therefore, a simple system may be provided, which allows flexible and rapid replacement of support elements 12 or stiffening faces 9 or longitudinal stiffening ribs 8. For example, different sized elements of the cabin structural unit 1 may be used to adjust the size of the cabin structural unit 1.

An exemplary embodiment of a loose bearing 3 is additionally shown in FIG. 6. The cabin structural unit 1 may be mounted via a rail system, for example. The loose bearing, as shown in FIG. 6, comprises a rail running along the x-axis, for example, into which the cabin structural unit 1 may be introduced. The loose bearing 3 having the rail may be fastened to a floor structure 6, for example, to thus transmit forces to the aircraft structure 5. Forces along the longitudinal axis of the aircraft, or along the x-axis, are not transmitted, so that the cabin structural unit 1 is displaceable along the aircraft longitudinal axis. In addition, as shown in FIG. 6, a fixed bearing 4 may also be provided, which additionally absorbs the forces in the aircraft longitudinal axis, so that the cabin structural unit 1 may transmit forces to the aircraft structure 5 in all three spatial directions and is thus fixed in its position. The fixed bearing 4 may comprise an eye, for example, as shown in FIG. 6, into which the support frames 11 and/or the support elements 12 may be inserted, for example.

Additionally the fixed bearings 4 may be designed to transmit forces in x-direction of the aircraft fuselage 5 between the cabin structural unit 1 and the aircraft structure 5 for absorbing crash loads in case of emergencies, for example. The fixed bearings 4 and/or the loose bearings may be placed around the cabin structural units 1, 10 in order to provide a fixed connection to the fuselage, the aircraft structure 5 or the floor structure 6. Thus, the location of the bearing of the cabin structure 1, 10 may be variable around the circumferential skin of each cabin structural units 1, 10.

Figure 7:
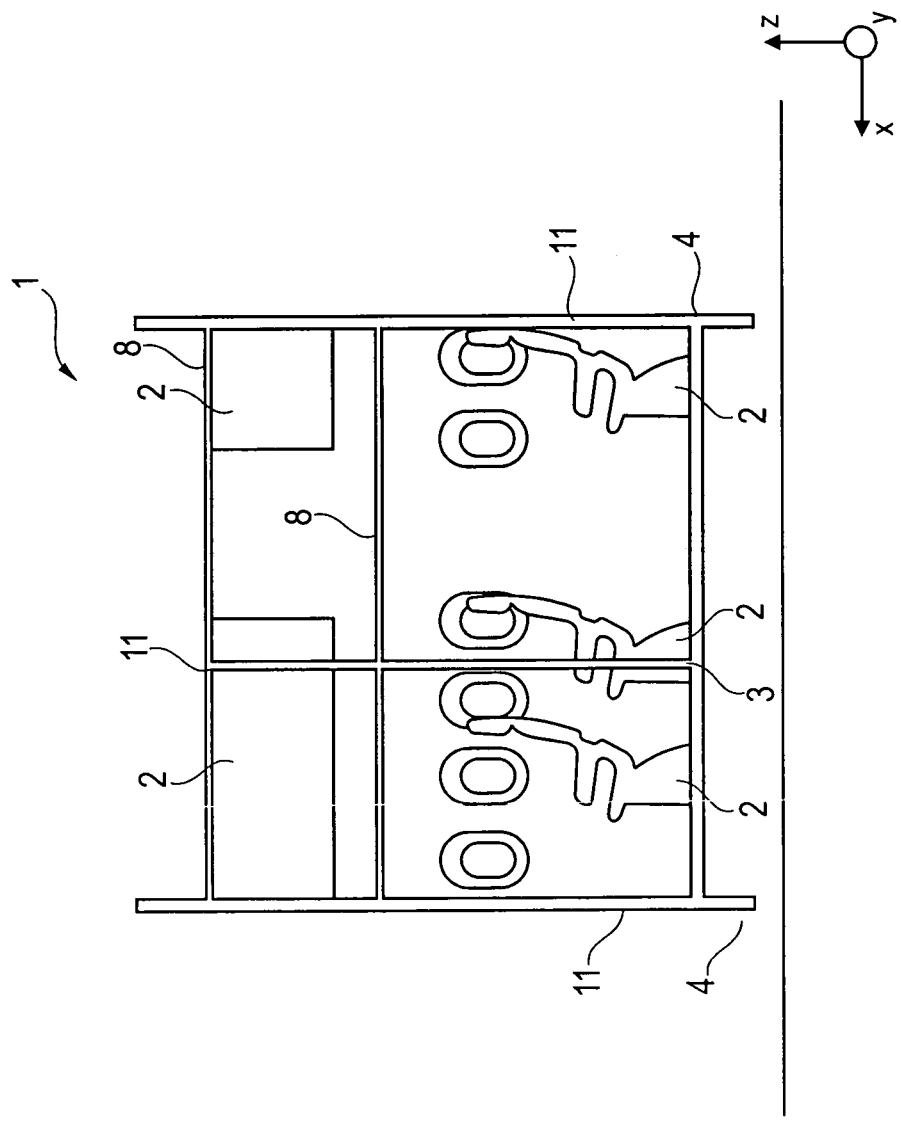
FIG. 7 shows a schematic illustration of a cabin structural unit having various bearings according to an exemplary embodiment of the present invention.

FIG. 7 shows an exemplary mounting of a cabin structural unit 1 in an aircraft fuselage and/or in an aircraft structure 5. A support frame 11, which is fastenable to the aircraft structure 5 using a fixed bearing 4, is located in each case on the right and left end of the illustration detail. A plurality of intermediate support frames 11 may be situated for stiffening the cabin structural unit 1, which may only be situated on the aircraft structure using a loose bearing 3. Greatly varying cabin installation elements 2, such as hat racks or seat elements may be fastened in this self-supporting cabin structural unit 1. The separating gaps between the cabin installation elements 2 may be kept so small that they may be joined. Compensation elements 20, which dampen a relative movement to the neighboring cabin structures 10, may be used on the fixed bearing devices 4 or on the support frames 11 which delimit the cabin structure 1.

Figure 8:
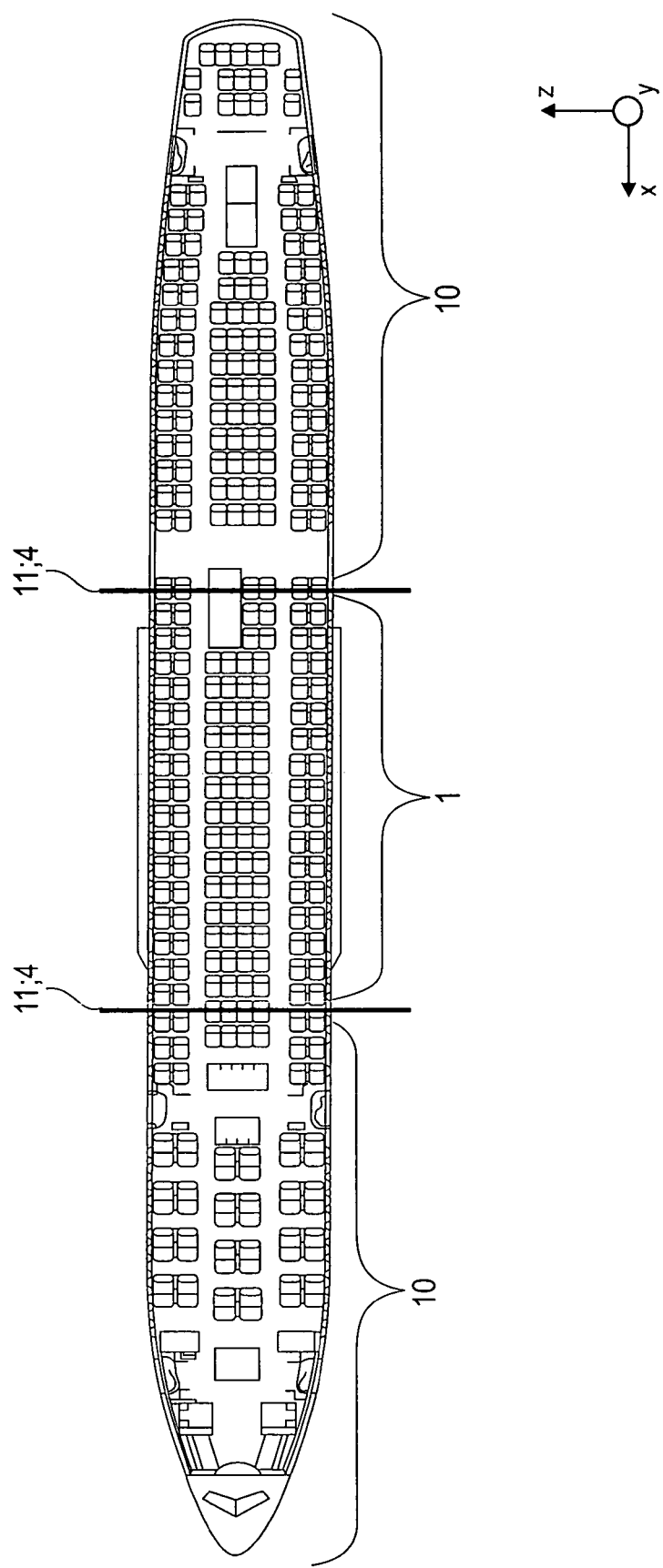
FIG. 8 shows a schematic illustration of an aircraft fuselage having a plurality of first and second cabin structural units according to an exemplary embodiment.

FIG. 8 shows a top view of an aircraft fuselage which comprises a plurality of cabin structural units 1, 10. Two cabin structural units 10 are situated on the forward fuselage area and on the rear fuselage area. The first cabin structural unit 1 is situated in the middle of the aircraft fuselage. For example, the support frames 11 of the first cabin structural unit 1 and the second cabin structural unit 10 are located at the transition area. The cabin structural units 1, 10 are fastened to the aircraft structure 5 using a fixed bearing 4 at the transition areas, for example.

In an aircraft fuselage, the wing box, which is implemented as especially stiff, is located in the middle area. In addition, the center of gravity of the aircraft is usually also located in this wing box area, so that small deformation torques arises in the middle of the aircraft fuselage. Therefore, the largest deformations of the aircraft structure 5 arise in the forward aircraft fuselage area and in the rear aircraft fuselage area. To allow a relative movement between the first cabin structural unit 1 and the second cabin structural unit 10, a gap may be provided, which permits the relative movement of the cabin structural units 1, 10. Because, as in the present example, only three cabin structural units 1, 10 may be situated over the entire aircraft fuselage, only two gaps are necessary to allow the relative movement between the cabin structural units 1, 10. Therefore, for example, only two gaps have to be provided with compensation elements 20, so that a reduced maintenance outlay results because of the reduction of the compensation elements 20. In the event of changes of a cabin layout and/or a change of the position of the cabin structural units, tightness of the aircraft structure 5 thus only has to be checked at two transition areas, for example. Maintenance costs and the maintenance time may thus be reduced.

FIGS. 9 and 10 show exemplary embodiments of cabin structural units 1 comprising several cabin structural segments 16 that form the cabin structural units 1 and that are connected by hinges 18. Each side of the cabin structural unit 1 provides in this exemplary embodiment one hinge 18, so that the cabin structural unit 1 may be folded as shown in FIG. 10. Referring to FIGS. 11 and 12, a cabin structural unit 1 may comprise a plurality of cabin structural segments 16 each connected by hinges 18. Referring to FIG. 12, small packages of a cabin structural unit may be provided in a folded status.

Figure 13:
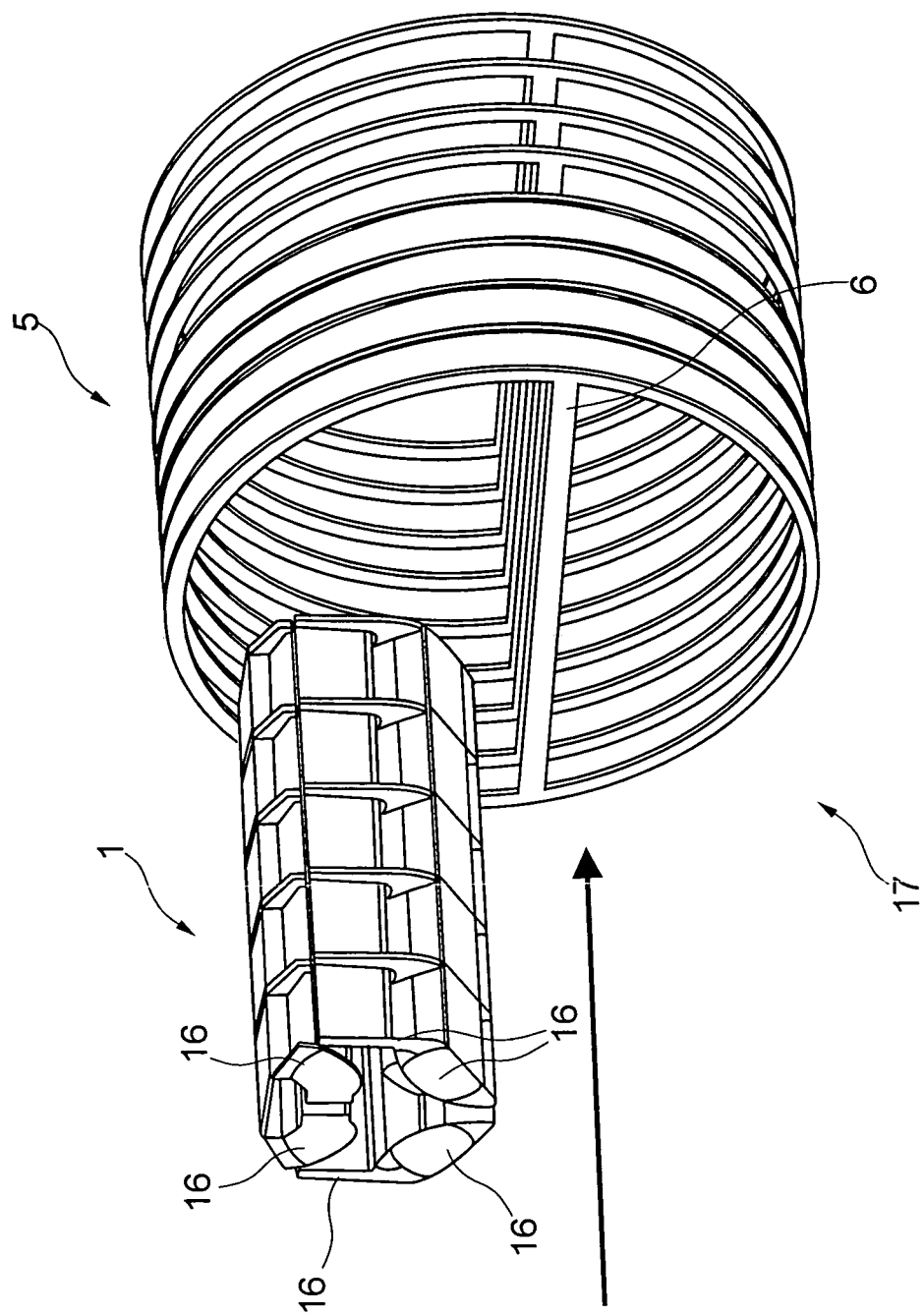
FIG. 13 to 15 show schematic illustrations of a method for installing a cabin structural unit according to an exemplary embodiment of the present invention.
Figure 14:
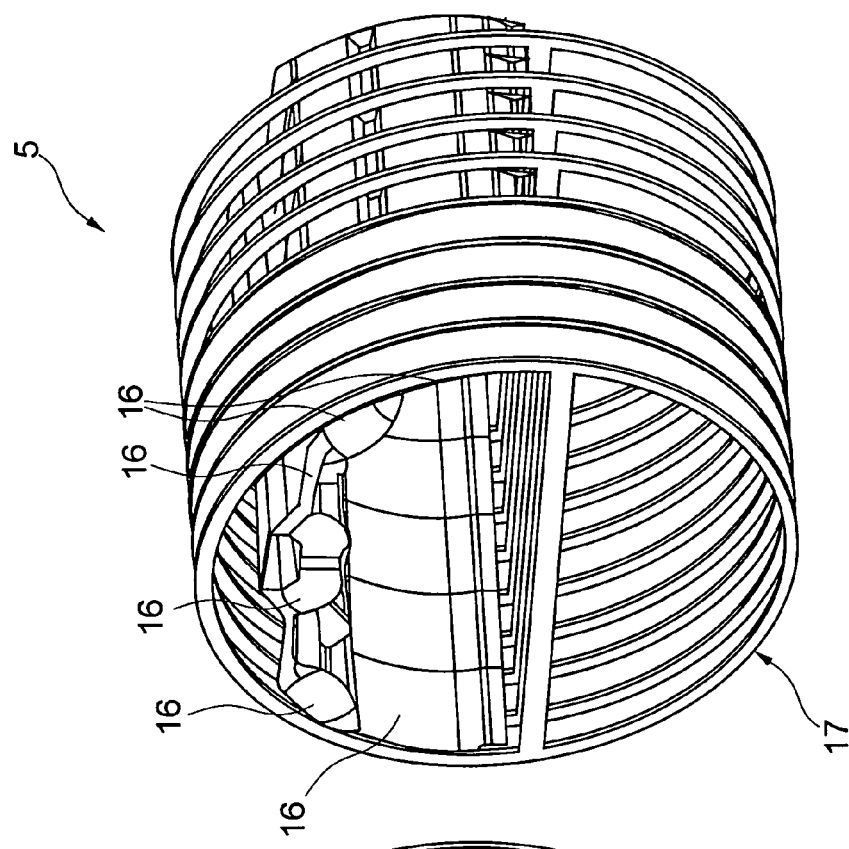
Figure 15:
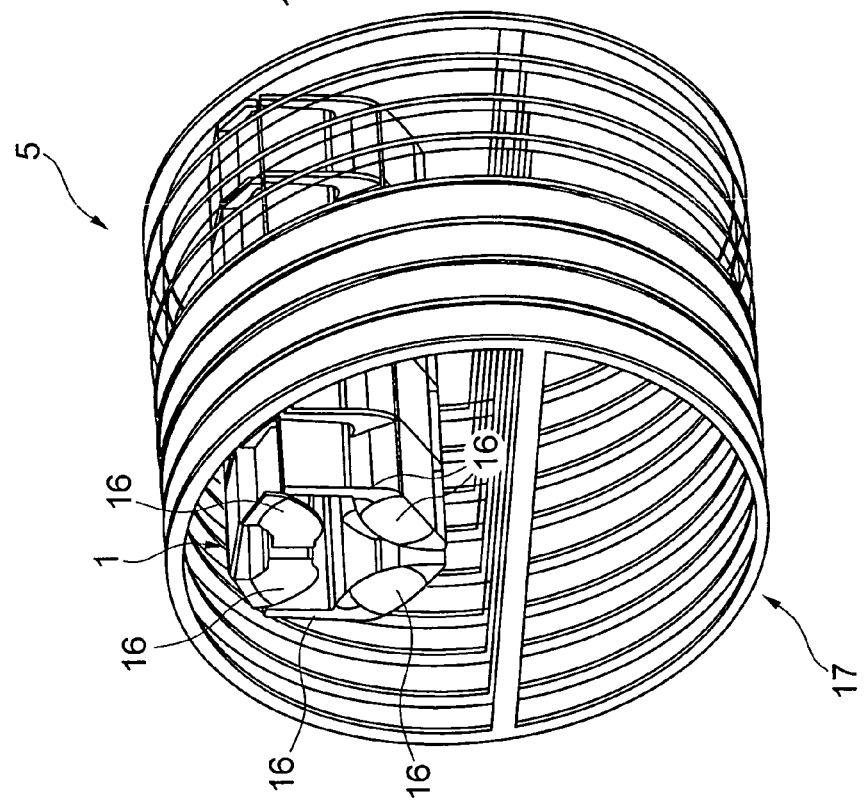

FIG. 13 to 15 show a possibility for assembling a foldable cabin structural unit. All cabin structural segments 16 may be assembled before guiding the cabin structural unit into the fuselage segment. Referring to FIG. 13, the structural unit 1 and the cabin installation units 2 may be preassembled outside of the aircraft structure 5. The preassembled cabin structural unit 1 in the folded status thus provides small volume. As shown in FIG. 14, the folded cabin structural unit 1 may be guided to the predetermined fixing location at the aircraft structure 5. After reaching the predetermined fixing location at the aircraft structure 5 the cabin structural segment 16 may be defolded and fixed to the aircraft structure 5, as shown in FIG. 15. Thus, an easy and fast way of installing a cabin structural unit may be provided.

Figure 17:
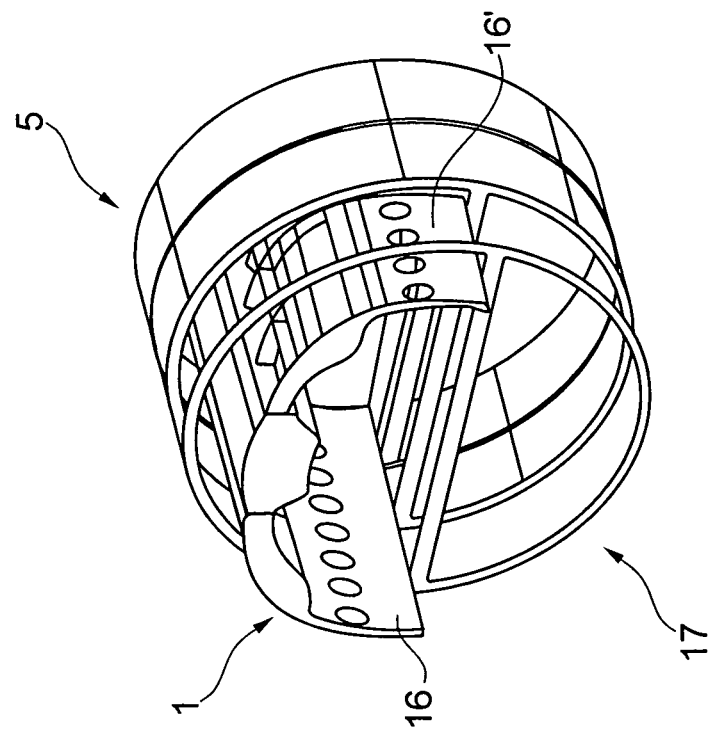
FIGS. 16 and 17 show schematic illustrations of an installation method for a cabin structural unit consisting of several cabin structural segments according to an exemplary embodiment.
Figure 16:
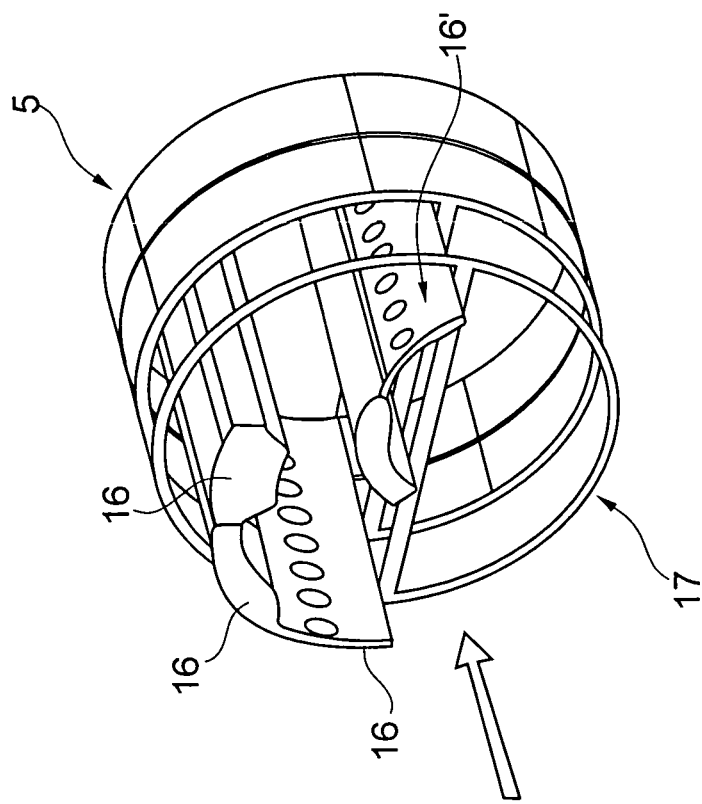

FIGS. 16 and 17 shows further possibility of mounting a cabin structural unit 1 to an aircraft structure 5. The cabin structural unit 1 may also comprise several cabin structural segments 16 that are guided separately into the aircraft structure 5 to the predetermined location. Next, the cabin structural segment 16, 16" are connected together in order to build the cabin structural unit 1. Thus, at least some parts of the cabin structural unit may be preassembled outside of the aircraft and thus may accelerate the assembling procedure.

Figure 18:
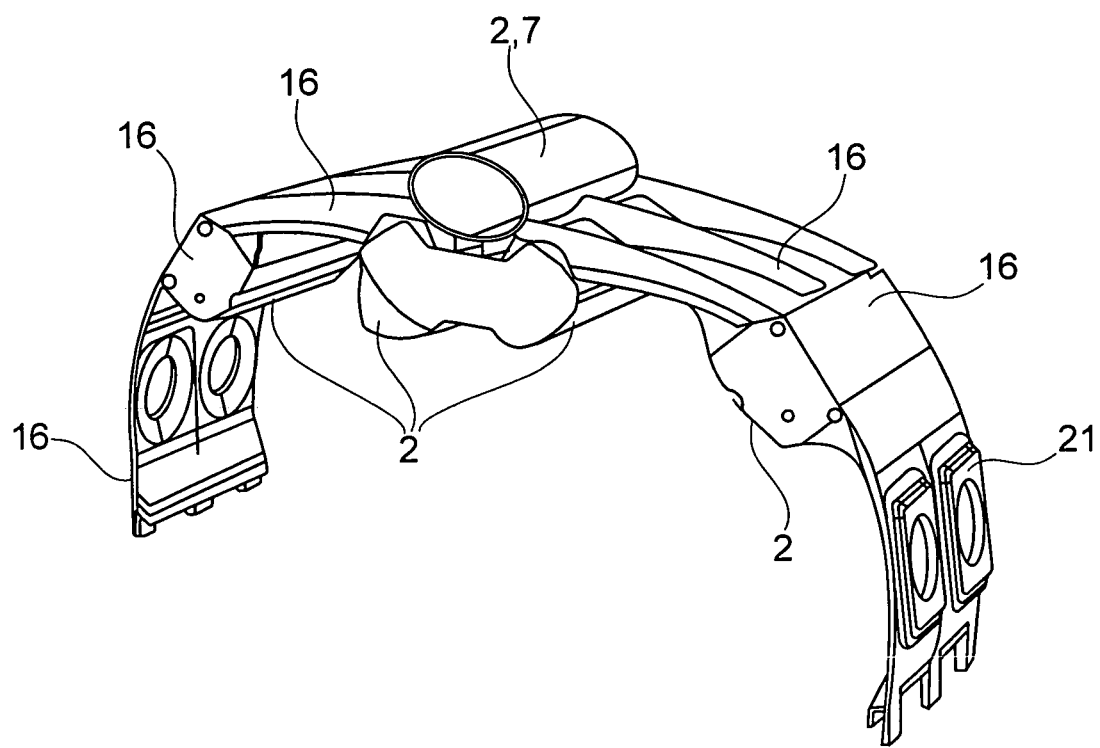
FIG. 18 shows a schematic illustration of a cabin structural unit including several cabin installation elements according to an exemplary embodiment.

FIG. 18 shows a schematic illustration of a cabin structural unit 1 consisting of several cabin structural segments 16 and several cabin installation elements 2. For instance, the cabin installation elements 2, such as air ducts and hat racks may be installed outside in the cabin structural unit 1. Thus, interface elements 21, such as windows adapting units, may be installed outside of the aircraft structural unit 1. Thus, a prefabricated cabin structural unit including all functional elements, such as cabin installation elements 2, connection elements 7 and interface elements 21 may be preassembled outside of an aircraft fuselage, so that a quick and easy installation inside of the aircraft structure 5 may be provided.

Figure 19:
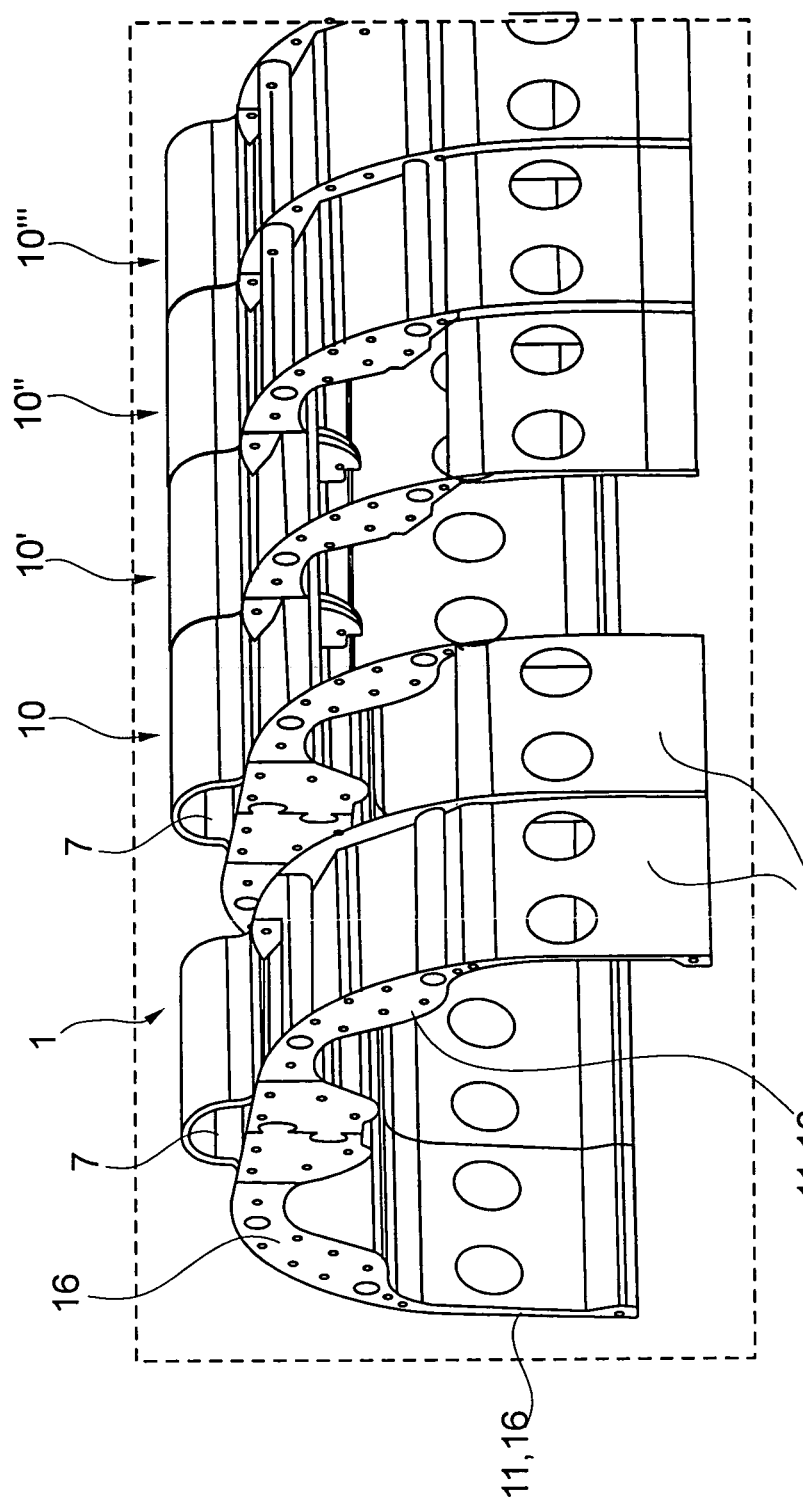
FIG. 19 shows a schematic illustration of first and second cabin structural units forming a fuselage cabin according to an exemplary embodiment.

FIG. 19 shows an aircraft cabin consisting of several cabin structural units 1, 10, 10', 10", 10''' that are fixed together. As shown in FIG. 19, the whole aircraft cabin may be assembled modularly by several cabin structural units 1, 10, 10', 10", 10'''. Each cabin structural unit itself may be preassembled outside of the aircraft and finally assembled together with the cabin structural units 10 in the aircraft structure. Each cabin structural unit 1, 10 itself may be consisting of stiffening faces 9, supporting frames 10, cabin structural segments 16 or connection elements 7, for instance.

The cabin structural units 1, 10 may be fixed together by fixing elements in an easy manner. Between the cabin structural units, a compensation element 20 may be inserted in order to compensate movements of each single cabin structural unit 1, 10. Each cabin structural unit 1, 10 may be designed in that way, and that the compensation element 20 is not visible for the passenger. The gap between the cabin structural units 1, 10 may be reduced referring to conventional aircraft cabins due to decoupling the inner cabin structural units from the aircraft structure, so that changes in the volume of the aircraft structure 5 due to pressure or temperature may not affect the inner cabin structural units 1, 10.

Figure 20:
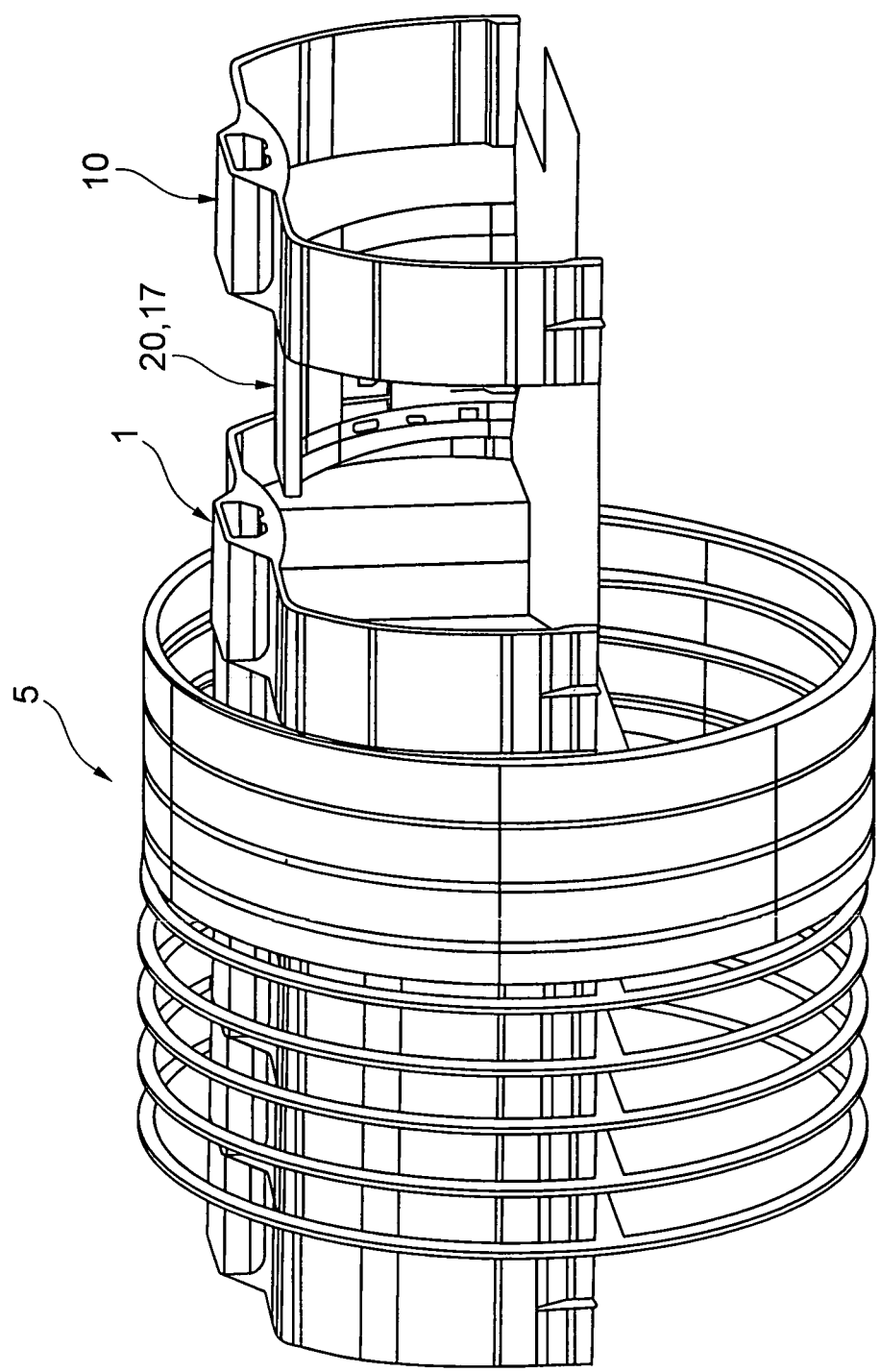
FIG. 20 shows a schematic illustration of an aircraft fuselage including first and second cabin structural units combined by compensation elements according to an exemplary embodiment.

FIG. 20 shows an exemplary build-up of an aircraft fuselage including several cabin structural units 1, 10. In order to compensate movements between each cabin structural unit 1 and 10 also the so-called door split line may be used as compensation element 20. Thus, the cabin structural unit 1, 10 may move relatively in opposite direction to each other, and therefore without raising the stress impact of each cabin structural unit 1 and 10 due to these relative movements.

The cabin structural unit 1 may be attached to the aircraft structure 5 by loose bearings 3 or fixed bearings 4. The cabin installation element 2 may also consist of monuments, such as galleys, toilets or other functional sections inside a cabin. The cabin installation elements 2 are integrated into the self-supporting cabin structural units 1, 10 and also decoupled from the aircraft structure 5. Thus, in case of deformation of the cabin structural unit 1, the cabin installation elements 2 move also in this and not in the opposite direction. Thus, the risk of damages resulting of opposite movements of each cabin structural unit 1 respectively the cabin installation element 2 may be reduced. By using a combination of loose and fixed bearings 3 and 4 also the movement in the vertical direction, respectively the z-axis may be reduced, so that merely movements in the longitudinal fuselage direction may be provided.

Figure 21:
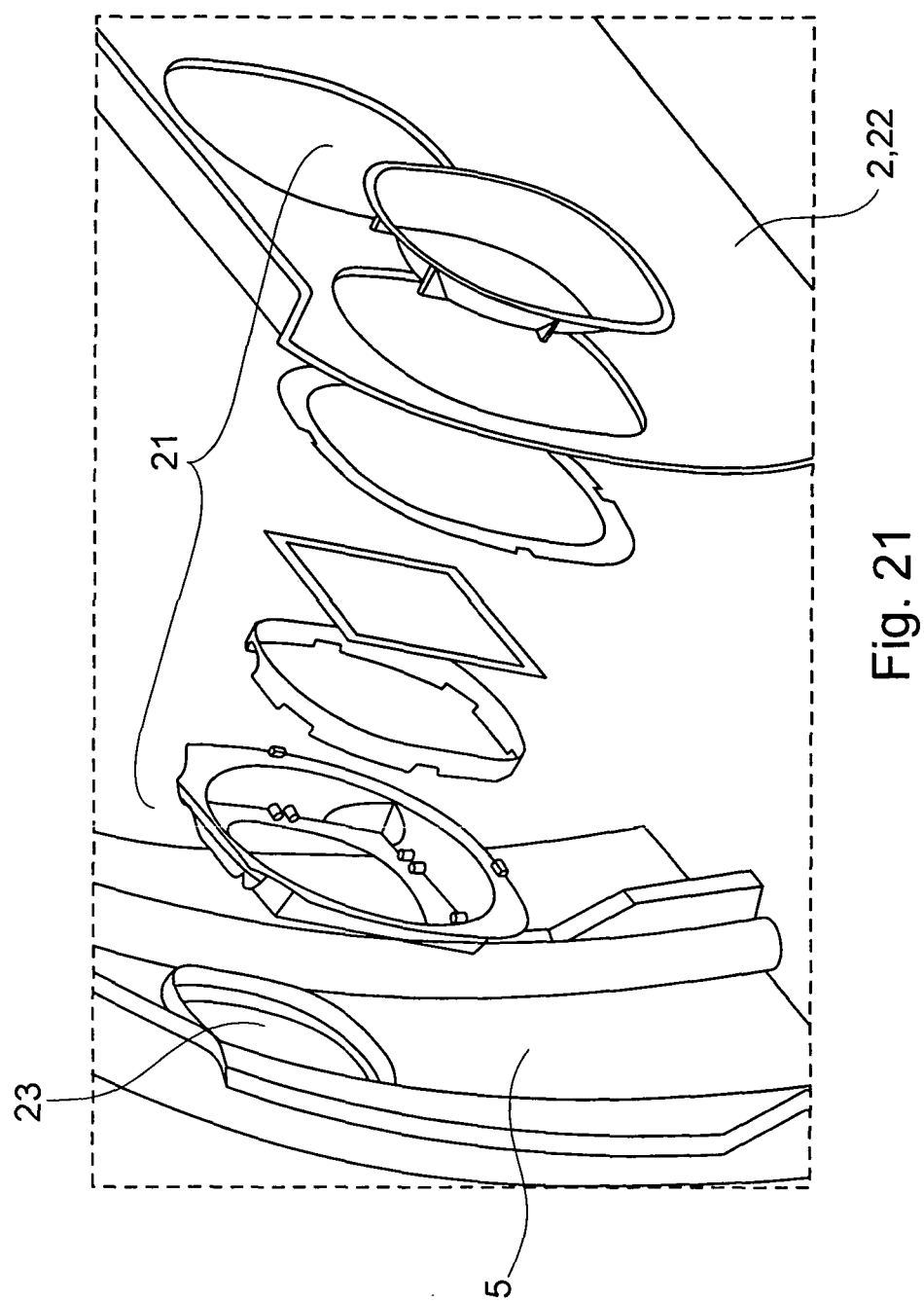
FIG. 21 shows a schematic illustration of an interface element connecting cabin installation elements and the aircraft structure according to an exemplary embodiment.

FIG. 21 shows a schematic illustration of an interface element 21 connecting cabin installation elements 2 of the cabin structural unit 1 to an aircraft structure 5. For instance, air ducts as well as window units have to be connected to installations of the aircraft structure 5. In case of the window panel 2, 22, it is necessary to provide a interface element 21 to the window openings 23 of the aircraft structure 5. The interface element 21 provides this connection between the window panel 22 and the window opening 23. The interface element 21 may provide several parts in order to provide sealing and flexible properties. The interface element 21 has to be flexible, because relative movements between the aircraft structure and the cabin structural unit 1 may occur.

The interface element 21 may provide for instance a push-in and snap connection so that in an easy way the cabin installation elements 2 may be connected to functional elements of the fuselage structure 5. By using push-in and snap connections for the connection of the installation elements 2, the assembling time may be reduced.

Moreover, it is to be noted that "comprising" does not exclude other elements or steps and "a" or "one" does not exclude multiples. Furthermore, it is to be noted that features or steps which have been described with reference to one of the above exemplary embodiments may also be used in combination with other features or steps of other exemplary embodiments described above. Reference numerals and the claims are not to be viewed as a restriction.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:
1. A cabin structural unit for attaching cabin installation elements for an aircraft, comprising:
  at least one first cabin structural segment arranged at a first side of the cabin structural unit to form a first sidewall of the cabin structural unit,
  at least one second cabin structural segment, and a third cabin structural segment arranged at a second side of the cabin structural unit, the third cabin structural segment forming a second sidewall of the cabin structural unit, the second side of the cabin structural unit located opposite the first side, the at least one second cabin structural segment coupled to the at least one first cabin structural segment to at least partially form a ceiling of the cabin structural unit;

a hinge connected to the first cabin structural segment and to the second cabin structural segment such that the cabin structural unit is movable from a folded configuration to an unfolded configuration;

a cabin installation element couplable to at least one of the first cabin structural segment and the at least one second cabin structural segment;

a loose bearing device including a first rail directly fastened to a floor structure of the aircraft and a second rail directly fastened to the floor structure of the aircraft, the second rail spaced apart from the first rail in a cabin of the aircraft;

wherein the cabin structural unit is self-supporting;

wherein the at least one first cabin structural segment has a first end section and the third cabin structural segment has a second end section, the first end section received in the first rail and the second end section received in the second rail such that the cabin structural unit is fastened to the floor structure using the loose bearing device and the cabin structural unit is displaceable along a longitudinal axis of the aircraft; and wherein the first cabin structural segment is connected to the second cabin structural segment by the hinge such that the cabin structural unit can be preassembled outside a fuselage of the aircraft, folded together to reduce a distance between the first end section of the first cabin structural segment and the second end section of the third cabin structural segment such that the cabin structural unit in the folded configuration passes through an opening of the fuselage of the aircraft, the cabin structural unit in the folded configuration moved into the fuselage and unfolded.

2. The cabin structural unit of claim 1, further comprising:
a plurality of support frames; and
a longitudinal stiffening rib,
wherein the longitudinal stiffening rib is installed between each of the plurality of support frames, and
wherein the longitudinal stiffening rib is adapted for transmitting a force along an aircraft longitudinal axis.

3. The cabin structural unit of claim 1, further comprising a fastener, wherein the cabin installation element is replaceably fastenable to the cabin structural unit using the fastener.

4. The cabin structural unit of claim 1, wherein the cabin installation element is adapted for being formed integrally with the cabin structural unit.

5. The cabin structural unit of claim 1, wherein the cabin installation element is adapted to be installed on the cabin structural unit for transmitting a force flux.

6. The cabin structural unit of claim 1, wherein the cabin structural unit comprises a stiffening face.

7. The cabin structural unit of claim 6, wherein support frames of a plurality of support frames comprising a plurality of support elements, and wherein the plurality of support elements are removably fastenable to one another.

8. The cabin structural unit of claim 7, wherein the plurality of support elements are removably fastenable to one another using a plug-in connection.

9. The cabin structural unit of claim 1, wherein the cabin installation element is selected from the group consisting of toilet units, kitchen units, seat units, design elements, stairway elements, baggage compartments, air provision units or elevator units.

10. The cabin structural unit of claim 1, wherein the cabin structural unit further comprises interface elements; and the interface elements are adapted to connect the cabin installation elements with at least one of the aircraft structure or the floor structure.

11. The cabin structural unit of claim 1, wherein the cabin structural unit is adapted for supporting the aircraft structure.

12. The cabin structural unit of claim 1, wherein at least the first cabin structural segment, second cabin structural segment and third cabin structural segment provide the cabin structural unit to be self-supporting.

* * * * *